United States Patent
Schmautz

(10) Patent No.: US 7,527,276 B2
(45) Date of Patent: May 5, 2009

(54) SCOOTER WITH AT LEAST ONE LATERALLY FOLD-OUT FOOT REST UNIT

(76) Inventor: Christian Schmautz, Illingweg 2, D-82441, Ohlstadt (DE)

( * ) Notice: Subject to any disclaimer, the term of this patent is extended or adjusted under 35 U.S.C. 154(b) by 51 days.

(21) Appl. No.: 11/575,677

(22) PCT Filed: Sep. 22, 2005

(86) PCT No.: PCT/EP2005/010275

§ 371 (c)(1), (2), (4) Date: Mar. 21, 2007

(87) PCT Pub. No.: WO2006/032507

PCT Pub. Date: Mar. 30, 2006

(65) Prior Publication Data

US 2008/0061529 A1  Mar. 13, 2008

(30) Foreign Application Priority Data

Sep. 22, 2004  (DE) .................. 10 2004 045 971

(51) Int. Cl.
*B62K 17/00* (2006.01)

(52) U.S. Cl. .................. 280/87.05; 280/254; 280/270; 280/278; 280/261; 280/200

(58) Field of Classification Search ............ 280/87.05, 280/254, 270, 278, 261, 200
See application file for complete search history.

(56) References Cited

U.S. PATENT DOCUMENTS

| 3,990,717 | A | * | 11/1976 | Best | 280/278 |
|---|---|---|---|---|---|
| 4,111,447 | A | * | 9/1978 | Ishida | 280/278 |
| 4,182,522 | A | * | 1/1980 | Ritchie | 280/278 |
| 4,422,663 | A | * | 12/1983 | Hon | 280/278 |
| 4,448,437 | A | * | 5/1984 | Montague | 280/287 |
| 4,844,494 | A | * | 7/1989 | Blanchard | 280/278 |
| 5,351,979 | A | * | 10/1994 | Langen | 280/254 |
| 5,997,023 | A | * | 12/1999 | Sauter | 280/291 |
| 6,425,598 | B2 | * | 7/2002 | Murayama | 280/278 |

(Continued)

FOREIGN PATENT DOCUMENTS

DE  34487  1/1886

(Continued)

*Primary Examiner*—Christopher P Ellis
*Assistant Examiner*—Cynthia F Collado
(74) *Attorney, Agent, or Firm*—Sughrue Mion, PLLC

(57) ABSTRACT

The invention relates to a scooter with a frame, at least one front wheel (12), at least one rear wheel (11) and with a steering gear (3, 6, 7), with which at least one front wheel (12) is tractable, whereby the scooter comprises on the left and/or the right side of the axis connecting the front and rear wheels, respectively, (longitudinal axis of the scooter) between the centre of a front wheel (12) and the rear end of a rear wheel (11) one laterally fold-out foot rest unit (1), which cannot exert the function of a crank, i.e., which cannot be rotated by 360° around a transverse axis of the frame which is perpendicular to the longitudinal axis of the scooter, whereby the foot rest unit(s) (1) can be folded out mechanically or by means of a motor and whereby upon mechanically folding out by force effect by the driver the foot rest unit (1) returns in its initial position upon discontinuation of the force.

9 Claims, 12 Drawing Sheets

U.S. PATENT DOCUMENTS

| | | | |
|---|---|---|---|
| 6,474,667 B1 * | 11/2002 | Stocksmeier | 280/87.05 |
| 6,688,627 B1 * | 2/2004 | Strange | 280/278 |
| 6,695,334 B2 * | 2/2004 | Irlbacher | 280/278 |
| 7,159,884 B2 * | 1/2007 | Gu | 280/278 |
| 7,175,192 B1 * | 2/2007 | Lu | 280/287 |
| 7,290,780 B2 * | 11/2007 | Hsu | 280/287 |
| 7,341,270 B1 * | 3/2008 | Scholz | 280/287 |
| 2006/0232040 A1 * | 10/2006 | Franco | 280/278 |

FOREIGN PATENT DOCUMENTS

| | | |
|---|---|---|
| DE | 29810961 U1 | 11/1999 |
| DE | 10045844 A1 | 4/2002 |
| DE | 20021368 U1 | 5/2002 |
| DE | 10202981 C1 | 6/2003 |
| EP | 0229597 A2 | 7/1987 |
| FR | 651111 | 3/1928 |

* cited by examiner 2 a 2 b

Fig. 6
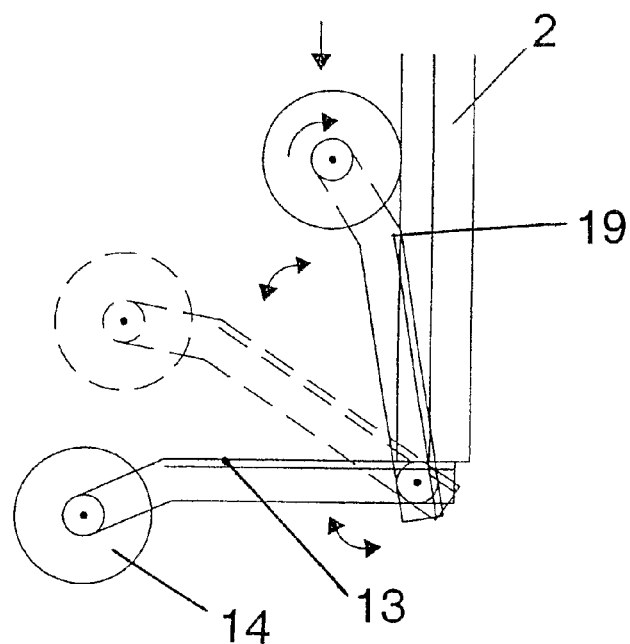
Fig. 7
Fig. 7a        Fig. 7b
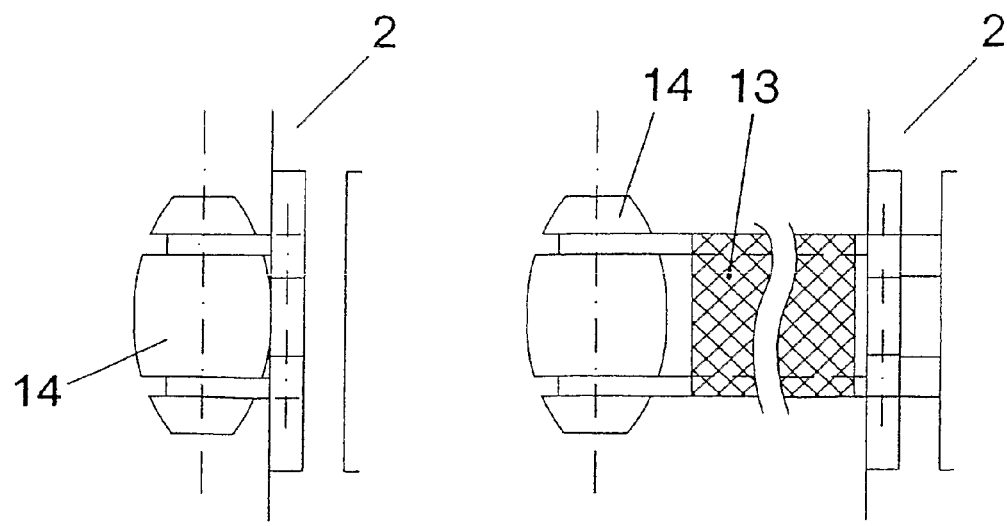

Fig. 8
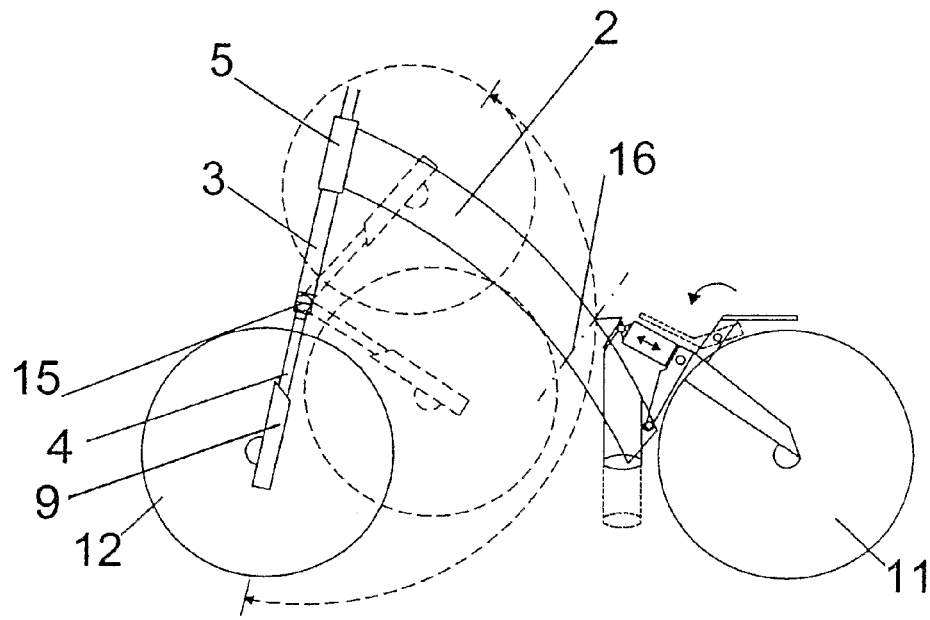
Fig. 9
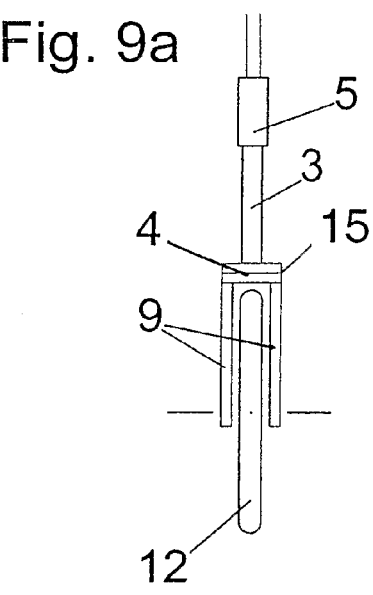
Fig. 9a          Fig. 9b

Fig. 12
Fig. 12 a
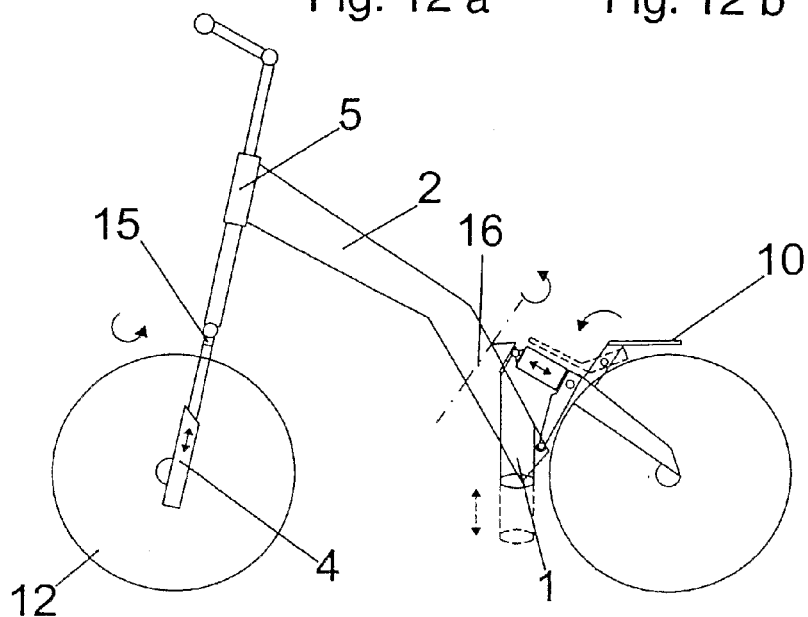
Fig. 12 b
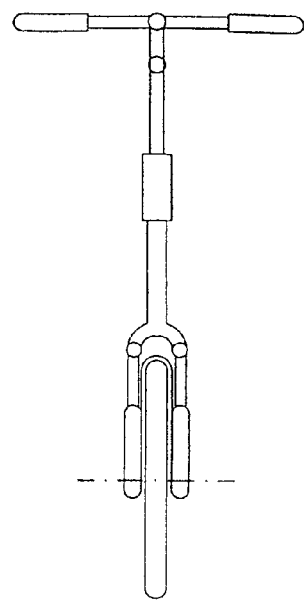
Fig. 12 c
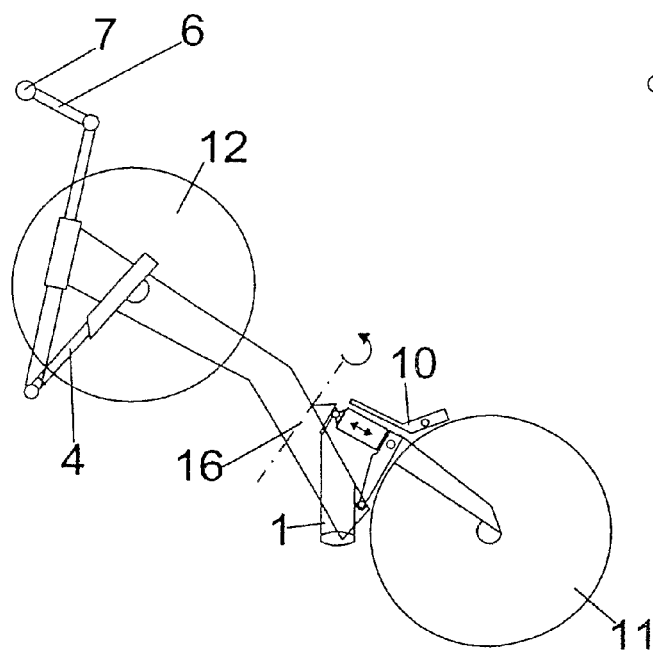
Fig. 12 d
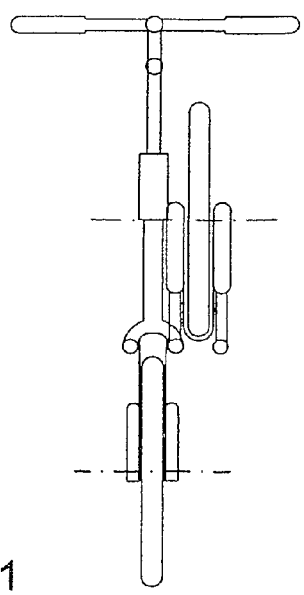

Fig. 12
Fig. 12 e
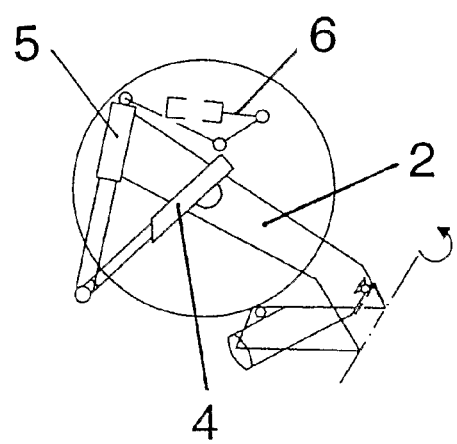
Fig. 12 f
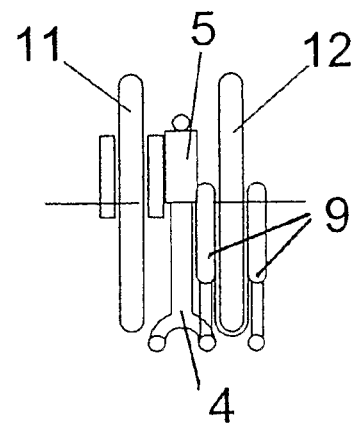
Fig. 13
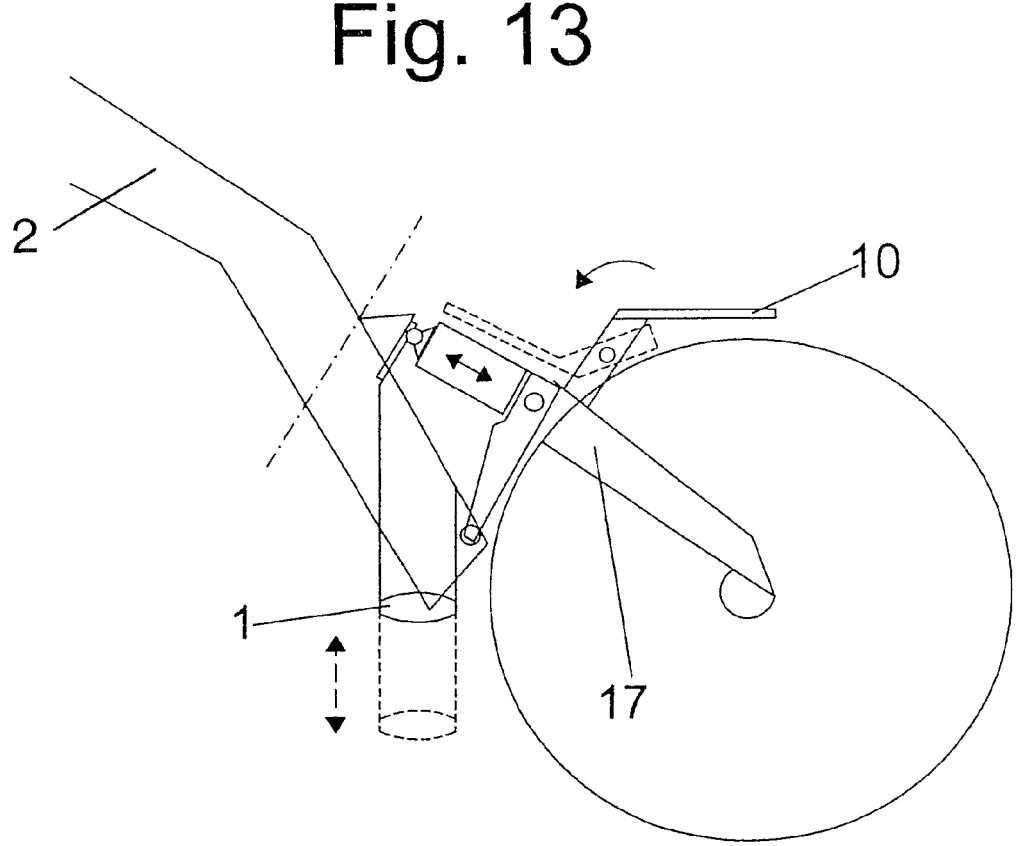

Fig. 16
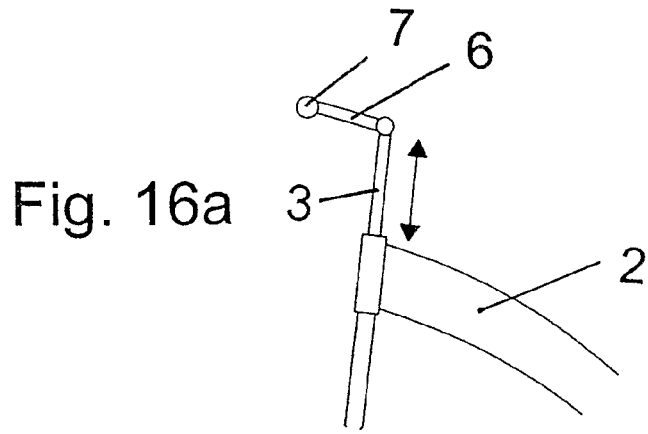
Fig. 16a
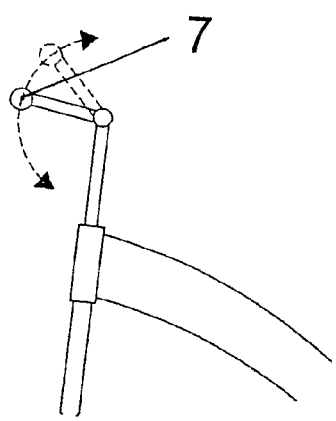
Fig. 16b
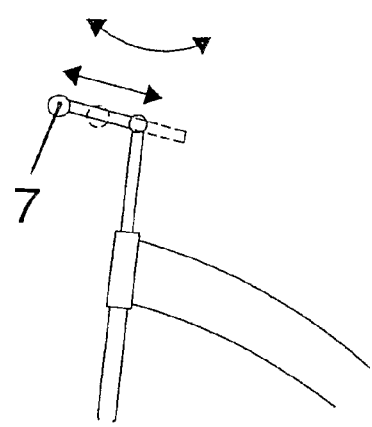
Fig. 16c
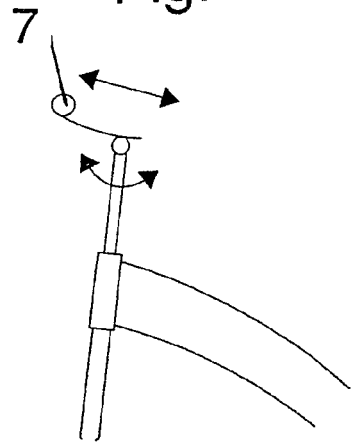
Fig. 16d
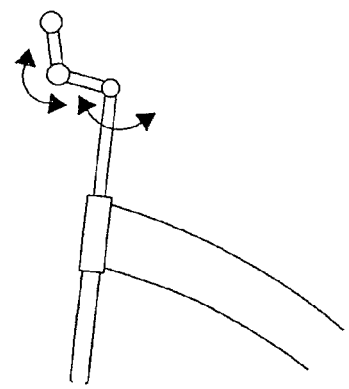
Fig. 16e Fig. 17
Fig. 17a
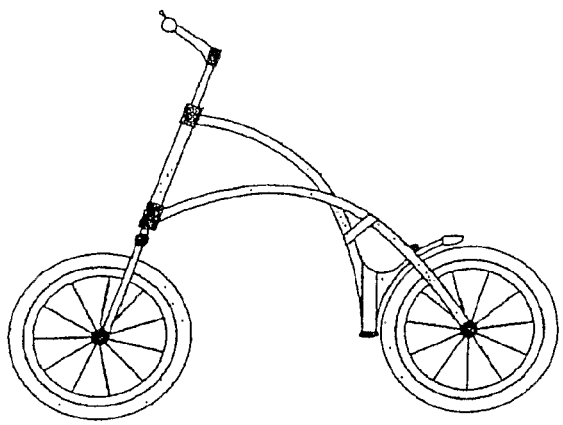
Fig. 17b
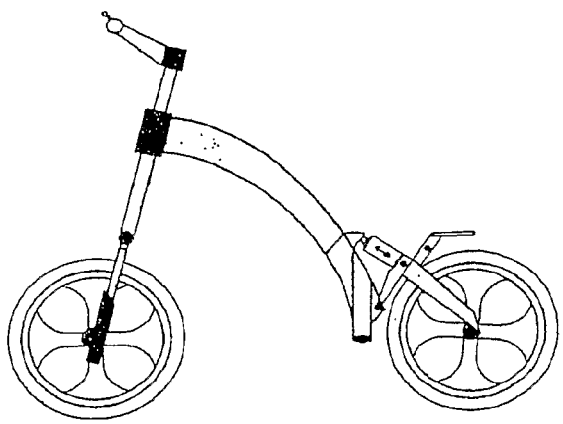
Fig. 17c
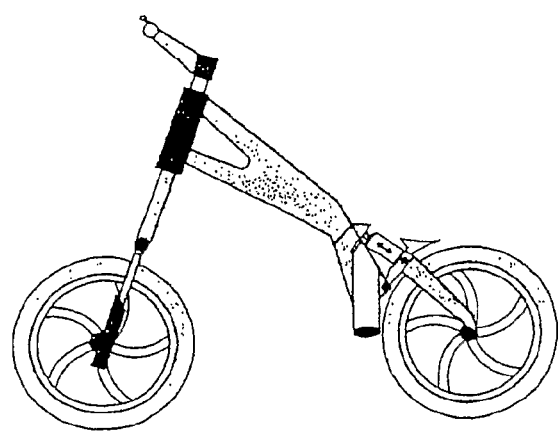

SCOOTER WITH AT LEAST ONE LATERALLY FOLD-OUT FOOT REST UNIT

The present invention relates to a scooter with a frame, at least one front wheel, at least one rear wheel and with a steering gear, with which at least one front wheel is tractable.

Scooters with in general two wheels are very popular for fast locomotion in a plain. The scooters provide in general no pedal drive ("Pedalantrieb"). With these known scooters, a relatively long stationary foot rest unit is placed centrally between two wheels. "Stationary" is to be understood here as meaning that the foot rest is placed fixedly. The position of the foot rest in relation to the wheels and the frame, respectively, thus cannot be changed during a ride.

Recently, foldable scooters ("fold scooters", "Faltroller") and foldable bicycles ("fold bikes", "Fahrräder") have appeared. With these fold scooters and fold bikes the minimum achievable size of the "package" to be formed is determined by the relatively large distance between the front and the rear wheel, respectively ("wheel base", "Radstand").

Locomotion is achieved with scooters in general by pushing away the scooter with the help of the legs, whereby one leg is placed in general in a quiet position ("Ruheposition") on a central foot rest. The use of motor propulsion for the wheels (for example of an electro or gasoline motor, respectively) is however not excluded in this connection.

In DE 101 58390 A a running wheel ("Laufrad") is described that may provide in one embodiment a foot rest unit that is in general formed by a foot rest that is placed at a suitable side of the running wheel close to the ground level.

In DE 101 58 852 A a multifunctional foldable two-wheeler is disclosed which may comprise a foot rest.

DE 199 26 363 A and DE 295 09 586 U disclose running wheels which have essentially the constitution of a bicycle without a pedal drive mechanism. The frame consists of a beam which corresponds in position and function to a transverse beam of a man's bicycle. Pneumatic wheels are provided that are attached to the frame via forks.

The German Utility Model specification DE 298 10 961 U1 discloses a two-wheeler in the shape of a running wheel with a longitudinal tube (8) on the top. In an embodiment of this two-wheeler (see FIG. 5 in DE 298 10 961 U1) a fold-out foot rest unit is fixed on each of the two sides of the rear wheel (4) at the driving collar (14) of the rear wheel.

The German Patent Specification DE 102 02 981 C1 discloses a rollaway vehicle ("Rollfahrzeug") with two wheels that provides a supporting member ("Stützorgan") which is formed as a foot rest, which may be in a position in which the supporting arms extend transverse to the plane. The height position of the supporting member is adjustable via the selection of the depth of insertion ("Einstecktiefe").

With the motorless rollaway vehicle described in the German Utility Model specification DE 200 21 368 U1 (see FIG. 1), foot rests (22) can be provided fixedly at the steering rod (12) at different heights.

EP 0 229 597 discloses a folding moped with a collapsible support for the saddle constituted by two parallel pillars with lower jointed end portions which are inserted within two hollow parts fixed to the frame. FIGS. 3 and 4 describe two locking appendages which are conveniently carried by two foot-rests rotatably supported on respective extensions of the stop pins so as to be pivotable between a raised inoperative position and a lowered position of use. In the lowered position of use, the locking appendages engage two holes under the action of respective thrust springs surrounding the appendages of the stop pins. Accordingly, the footrests are in a fixed position when the moped is in use. The different fixed positions of the foot-rest—vertical and horizontal, respectively—correspond to the moped in the state of driving and in the folded state, respectively.

The German laid-open patent application DE 100 45 844 A1 discloses a bicycle, in particular a foldable bicycle, as well as a process for folding a bicycle. The front part of the frame and the rear part of the frame are connected with each other through a main swivel joint ("Hauptdrehgelenk") such that the two parts of the frame can be folded towards each other from a locked state ("verriegelter Zustand") into a folded state ("Klappzustand"). Furthermore, a locking mechanism is provided for detachably locking both parts of the frame and/or the main swivel joint.

However, these known scooters or running wheels have disadvantages with respect to the handling, when the scooter is standing, but as well during a ride. The known scooters/running wheels possess a shape of construction which is directed in particular towards a large wheel base. Through this the cross-country mobility and agility as well as the foldability are negatively impacted.

With the known scooter, the stationary foot rest allows only a comparatively small ground clearance. Moreover, the standing position ("Stehposition") on the longitudinal axis is not ideal with respect to balance.

Recently, scooters have become known, which may be used in particular for descents, partially in very bumpy terrain ("Downhill" scooters). Such scooters differ from scooters used in a plain on even ground in particular in that they comprise bigger and broader wheels. Also with these scooters which are sometimes referred to as mountain scooter or scootboards, a stationary foot rest is placed between the two wheels.

The object of the present invention was therefore the provision of a scooter which overcomes or allows to overcome the disadvantages of the state of the art and which allows, in comparison with conventional scooters, a smaller distance between the two wheels and/or a smaller foot rest between the wheels.

A scooter has therefore been found with a frame, at least one front wheel, at least a rear wheel and with a steering gear, with which at least a front wheel is tractable, whereby the scooter comprises on the left and/or right side of the axis connecting the front and rear wheels, respectively, (longitudinal axis of the scooter) between the centre of the front wheel and the rear end of a rear wheel a laterally fold-out foot rest unit, which cannot exert the function of a crank, i.e., which cannot be rotated by 360° around a transverse axis of the frame which is perpendicular to the longitudinal axis of the scooter, whereby the foot rest unit(s) can be folded out mechanically or by means of a motor and whereby upon mechanically folding out by force effect by the driver the foot rest unit returns in its starting position upon discontinuation of the force.

Advantages and details of the invention will be explained in the following by referring to the particular embodiments of the invention which are shown in the Figures. In the description of the Figures, a front view on the fold-out foot rest units is a view in the direction of a transverse axis of the scooter and the frame of the scooter, respectively, according to the present invention. Accordingly, a side view on the fold-out foot rest units is a view in the direction of the longitudinal axis of the scooter according to the present invention. According to the invention, a foot rest unit comprises at least one foot area which can be brought from an essentially vertical position into an essentially horizontal position, each with respect to the driving plane, via a suitable mechanism. The term "fold-out" has thus to be construed broadly and is only limited by this definition.

FIG. 2a is a front view on the fold-out foot rest units and

FIG. 2b a side view.

Figure 3:
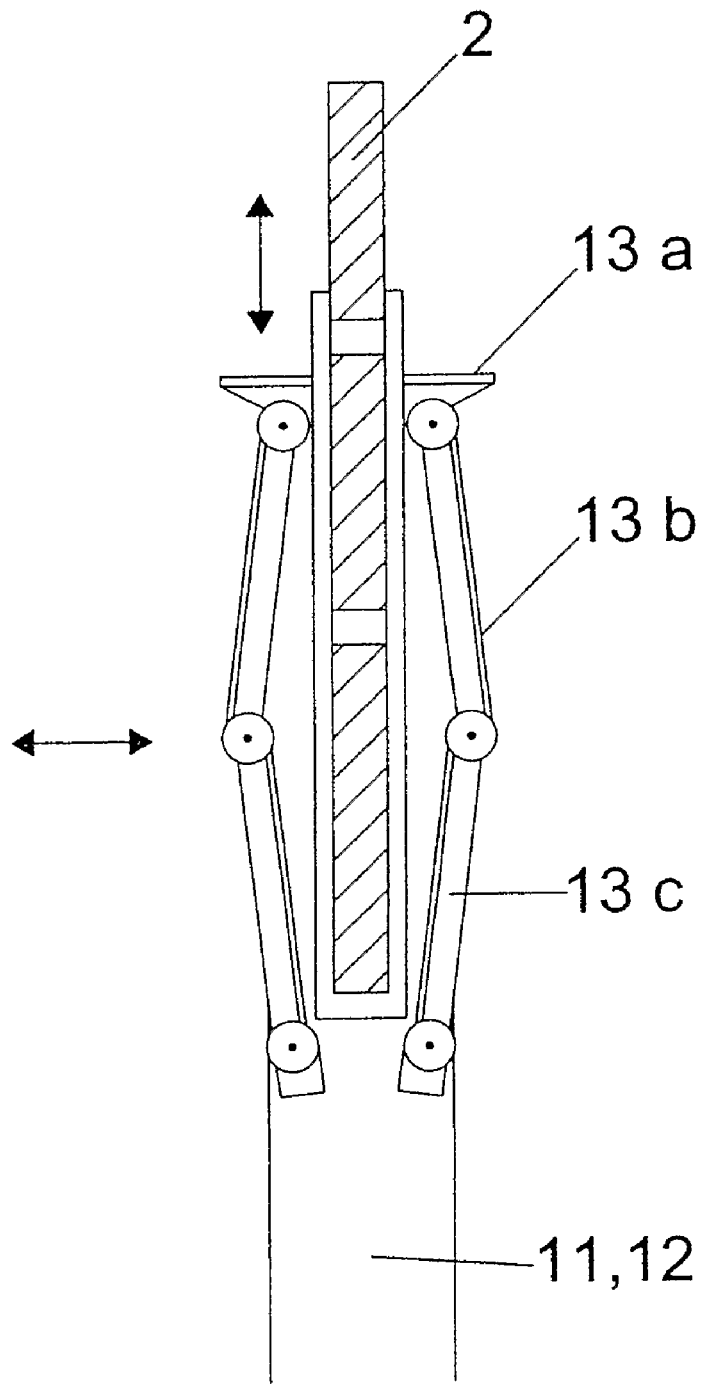

FIG. 3 shows a detained side view of a first embodiment of the fold-out foot rest unit in the scooter according to the present invention.

Figure 4:
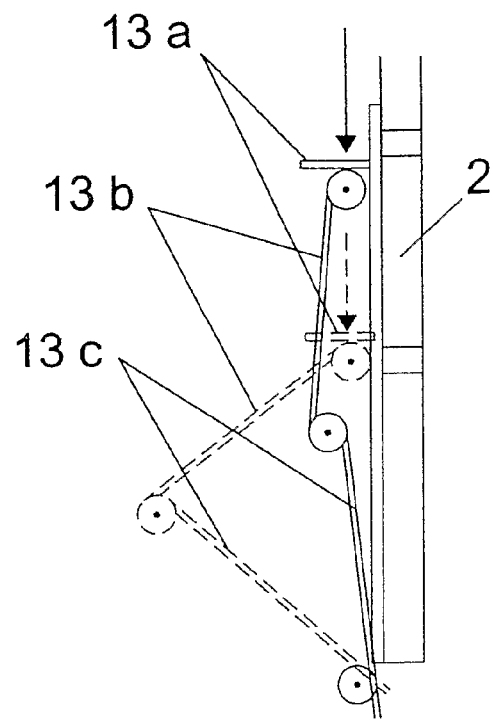

FIG. 4 shows a side view of a first embodiment of the fold-out foot rest unit in the scooter according to the present invention which illustrates the mechanism of folding out the foot rest.

Figure 5:
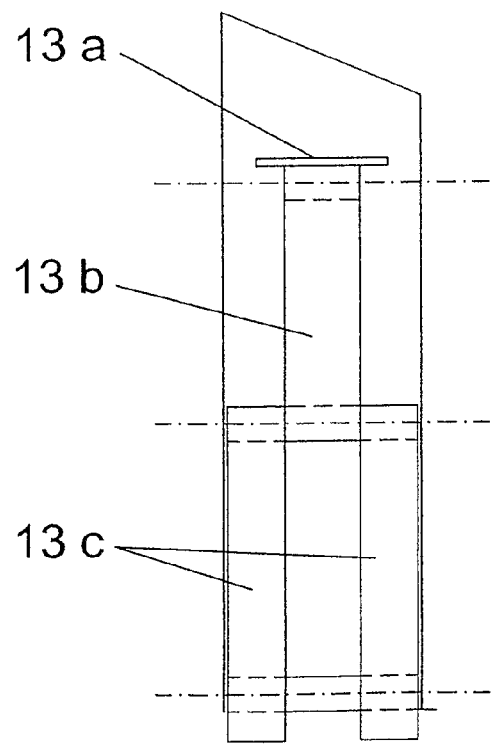

FIG. 5 shows a front view of a first embodiment of the fold-out foot rest unit in the scooter according to the present invention which illustrates the mechanism of folding out the foot rest.

FIG. 6 shows a side view of a second embodiment of the fold-out foot rest unit in the scooter according to the present invention.

FIG. 7 shows a top view on the second embodiment of the fold-out foot rest unit in the scooter according to the present invention. In FIG. 7a the foot area of the foot rest unit is in a vertical position while it is in FIG. 7b in a horizontal position.

FIG. 8 shows an embodiment for a foldable and dismountable, respectively, scooter according to the present invention.

FIG. 9 shows for the front wheel a first type for the folding of the scooter according to the present invention.

FIG. 9a shows the initial state before the folding and

FIG. 9b shows a state, wherein the front wheel is located laterally with respect to the main axis (longitudinal axis) of the scooter according to the present invention.

FIG. 10 shows for the front wheel a second type for the folding of the scooter according to the present invention.

Figure 10A:
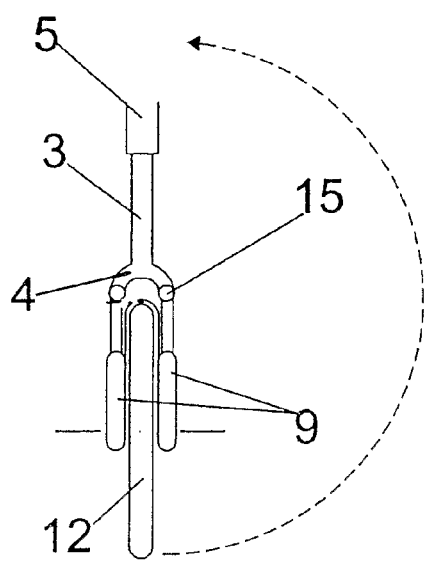

FIG. 10a shows the initial state and

Figure 10B:
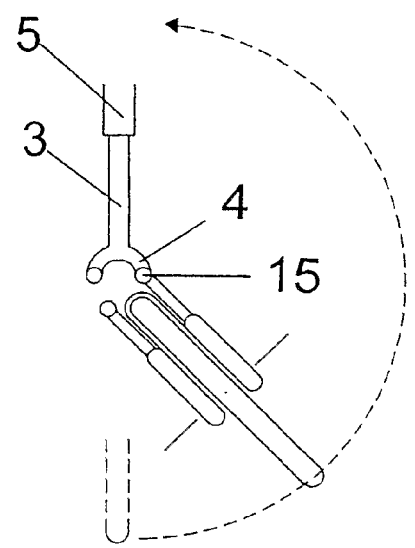

FIG. 10b the state after a partial screwing out of the front wheel.

FIG. 11 shows for the front wheel a third type for the folding of a scooter according to the present invention.

Figure 11A:
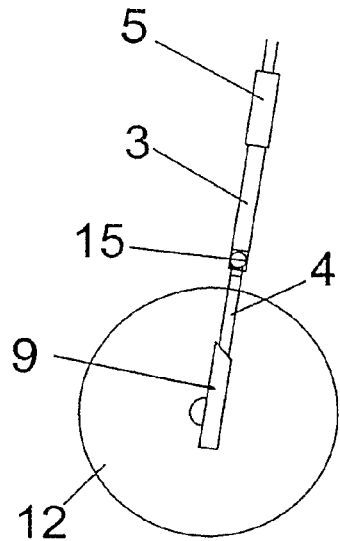

FIG. 11a shows the initial state and

Figure 11B:
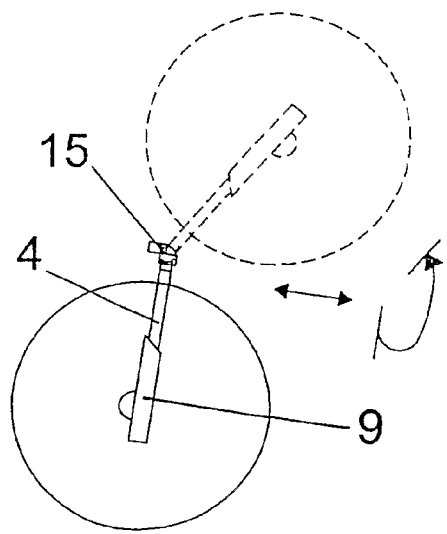

FIG. 11b the state after the assembly of front fork and front wheel has been shifted along the main axis (longitudinal axis) of the scooter in the direction of the rear wheel.

FIG. 12 shows an embodiment for a foldable scooter according to the present invention.

FIG. 12a shows a scooter in a ready-to-drive state, wherein the two inflection points in the steering shaft and the main frame are highlighted.

FIG. 12b shows a front view of the scooter of FIG. 12a.

FIG. 12c shows the scooter of FIG. 12a after the folding of the front wheel around the inflection point in the steering shaft and before the folding of the rear wheel around the inflection point in the main frame in the opposite direction.

FIG. 12d shows schematically a front view of the scooter of FIG. 12c.

FIG. 12e shows the scooter in the direction of the wheels in the completely folded state.

FIG. 12f shows schematically a front view of the scooter of FIG. 12e.

FIG. 13 shows a section of an embodiment of the scooter according to the invention which is provided with an additional central foot rest.

Figure 14:
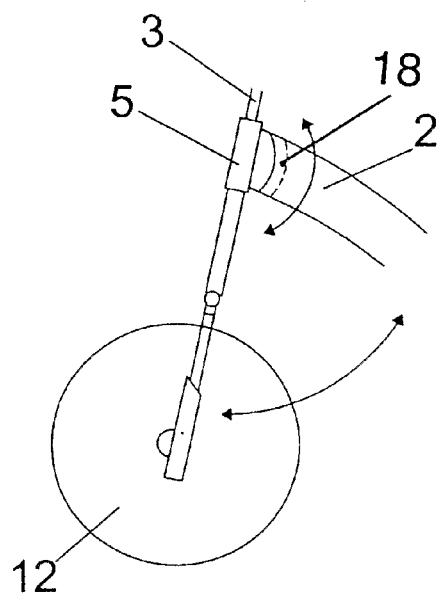

FIG. 14 shows an embodiment of the scooter according to the present invention, wherein the geometry of the frame can be modified by changing the angle between the steering shaft and the main frame.

Figure 15:
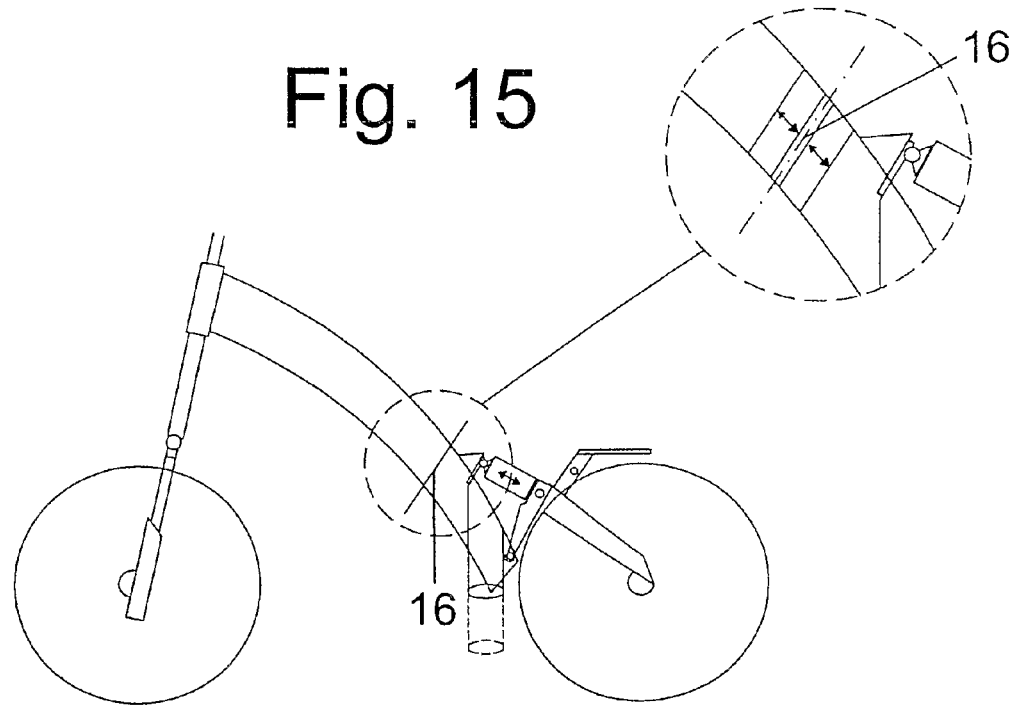

FIG. 15 shows an embodiment of an scooter according to the present invention, wherein the frame geometry can be shortened or extended by displacing the parts of a two-piece main frame towards each other or away from each other.

FIG. 16 shows embodiments of the scooter according to the present invention, wherein it is possible to change the geometry of the handle bar.

FIG. 16a shows the height adjustability of the steering shaft.

FIG. 16b shows the height adjustability of the front end ("Vorbau").

FIG. 16c shows the adjustability of the handle bar in horizontal direction. The

FIGS. 16d and 16e show further possibilities for adjusting the handle bar and front end.

FIG. 17 shows exemplary embodiments of the scooter according to the invention with different shapes of frames.

Figure 1:
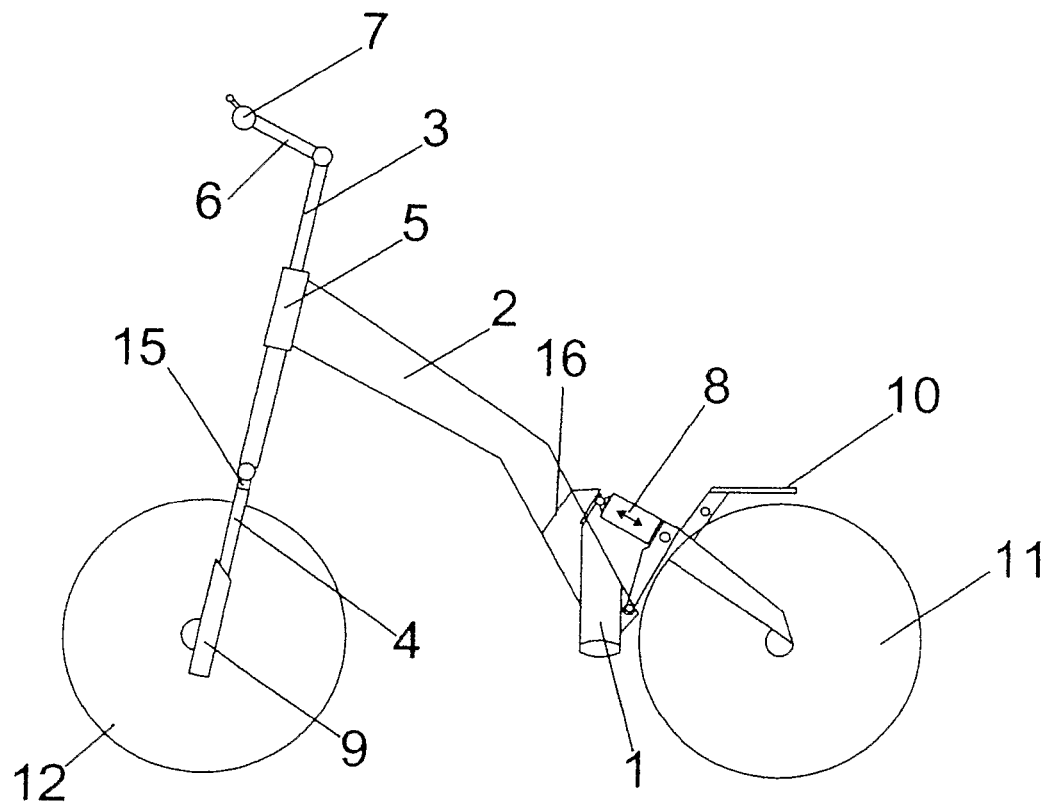
FIG. 1 shows a side view of an embodiment of the scooter according to the present invention.

FIG. 1 shows a side view of an embodiment of the scooter according to the present invention. In FIG. 1 1 means a laterally fold-out foot rest unit, 2 the main frame, 3 the steering shaft, 4 the front fork (suspension fork), 5 the juncture of main frame 2 and steering shaft 3, 6 the front end, 7 the handle bar, 8 the suspension for the rear wheel, 9 a fork leg (wishbone, spring leg), 10 a central foot rest, 11 a rear wheel and 12 a front wheel.

The embodiment of FIG. 1 is provided with a front wheel and a rear wheel, respectively. Front wheel or rear wheel in the scooter according to the present invention may represent however independently from each other for example a system consisting of two wheels each. If the later discussion mentions only one front wheel and one rear wheel, this occurs only in order to simplify the description. If not expressly indicated otherwise in the following description of the mode of operation of the invention, front wheel and rear wheel are in one plane.

In the embodiment of the invention shown in FIG. 1 of the invention, a front end 6 is shown, through which the handle bar 7 is connected with the steering shaft 3. The front end 6 may however be omitted such that the handle bar 7 is directly connected with the steering shaft 3.

The handle bar 7 may exist in different shapes. In the embodiment shown in FIG. 1, the handle bar 7 is straight. Depending on the intended use of the scooter, the handle bar 7 may however be formed differently. For example, the handle bar may be a cranked ("gekröpft") or a brought up ("hochgezogen") handle bar. A straight handle bar is advantageous particularly for fast rides in a plain. In contrast, a brought up handle bar is preferred for "downhill scooters".

In addition, the handle bar can be folded. In this variant, the handle bar consists of several parts, wherein the parts containing the grips can be folded, for example in the direction of the steering bar. For example, in one embodiment with a three-part straight handle bar, the two parts containing the grips can be folded after opening the fixation device (for example holding clamps ("Halteklammern")) downward in the direction of the steering shaft. Here, two pivot points exist in a three-part handle bar. However a two-part handle bar in which the two parts may be turned over around a pivot point at the end of the steering shaft in the direction of the sides of the steering shaft may be used also. For handle bars with a front end, the parts containing the grips may be turned preferably backwards.

According to the invention, a handle bar—unit may be provided which can be removed at the juncture between the steering shaft 3 and the main frame 2 by means of a locking unit that may be opened ("entriegelbare Befestigungseinheit").

Depending on the intended use of the scooter, the frame of the scooter according to he present invention can have various shapes. If the scooter is intended to be used in particular for downward rides ("downhill scooter"), the stability of the frame construction may be improved by different measures. For example, the front fork 4 may comprise a second bridge in order to attain an increased rigidity (so-called "double bridge fork" ("Doppelbrückengabel")). If the ease of transportation is of primary importance, also a very light construction is possible.

In FIG. 1 an optional central foot rest 10 is also shown. "Central" means in this context that the foot rest runs in the direction of the longitudinal axis of the scooter according to the invention.

The scooter according to the present invention of FIG. 1 comprises on the left and/or the right side of the longitudinal axis of the scooter a laterally fold-out foot rest unit 1 which cannot exert the function of a crank. This means that the fold-out foot rest cannot be rotated by 360° around a transverse axis of the frame. The longitudinal axis of the scooter is in this context the central connecting axis between the front and rear wheels 11, 12, respectively, of the scooter according to the present invention. For scooters with a pair of front wheels and/or rear wheels the longitudinal axis runs through the centres of the axes connecting the wheels of the pair of wheels. The aforementioned transverse axis of the frame runs in general through the centre of the foot rest unit.

The scooter of the present invention thus comprises in contrast to bicycles with chain drive no foot pedal. It is however possible that the foot rest unit can be rotated to a certain extent around a transverse axis through the centre of the foot rest unit 1. Preferably, the foot rest unit 1 can be rotated starting from its horizontal position (i.e. in parallel to the plane of driving) in each direction by less than 70°, in particular by less than 45° and moret particularly by less than 30° around the transverse axis through the centre of the foot rest unit 1.

Figure 2:
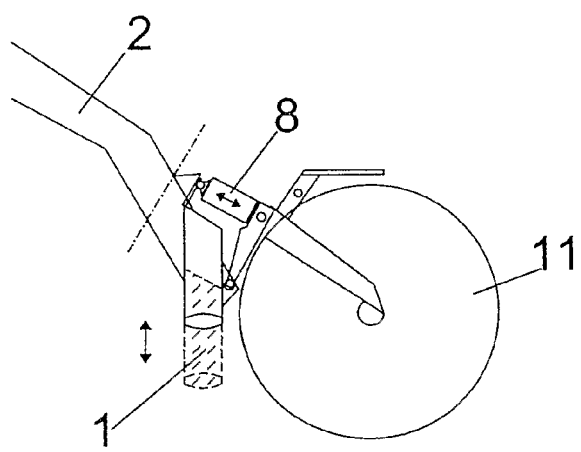
FIG. 2 shows an embodiment of the present invention, wherein the lateral fold-out foot rest units are shown enlarged.
Figure 2:
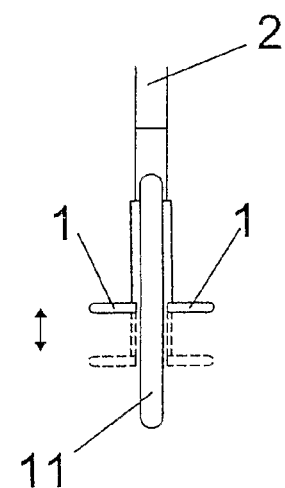

FIGS. 2 bis 7 show embodiments for foot rest units in the scooters according to the present invention and illustrate the mechanism of their folding.

FIG. 2 shows an embodiment of the invention, wherein the laterally fold-out foot rest units are shown enlarged. FIG. 2a is a front view on the laterally fold-out foot rest units and FIG. 2b is a side view. In FIG. 2a 11 means a rear wheel and 8 a suspension system. The foot rest units 1 in FIG. 2a and 2b comprise flat foot areas (rests). According to the invention different other types of surfaces are conceivable. For example, the foot rest may be pulled up at one end or at two ends of the foot rest. Moreover, the foot rest unit 1 may be constructed in a manner that the distance of the foot rest to the roadway may be varied during a ride with the scooter by means of a spring mechanism and/or the setting of fixed values for the distance.

FIG. 3 shows a detailed side view of a first embodiment of the fold-out foot rest unit 1 in the scooter according to the present invention. In FIG. 3 11 and 12 refer to the rear and front wheel, respectively, 13a to a small area of accession ("Antrittsfläche"), which serves to take up for example a foot upon mechanically folding out the whole foot rest 13. After the complete fold-out of the foot rest unit 1, the foot rest 13 consists of the sections 13a, 13b and 13c. The areas of accession 13a are placed to the left and/or to the right of the longitudinal axis of the scooter. Via pressure on the area of accession 13a which lies parallel to the roadway, the sections 13b and 13c of the foot rest, being essentially in a vertical position in the absence of a load, depart from the longitudinal axis of the scooter frame. With decreasing pressure on the area of accession 13a, the sections 13b and 13c of the footrest return to their vertical initial position on account of a spring mechanism (not shown in detail here).

FIG. 4 shows a side view of a first embodiment of the fold-out foot rest unit 1 in the scooter according to the present invention which illustrates the mechanism of folding out according to FIG. 3. Here, 2 means the main frame. The dashed part indicates the state after a partial pressing of the area of accession 13a in downward direction.

FIG. 5 shows a front view of a first embodiment of the fold-out foot rest unit of FIG. 4 before it is folded out. In the fold-out state, the sections 13a, 13b, and 13c of the foot rest are in one plane at equal distance from the plane of the roadway. The foot rest 13 formed by the foot rest sections 13a, 13b, and 13c can be rendered variable with respect to the distance from the ground by means of an additional spring mechanism. In a further embodiment of the invention, the distance to the ground may be fixedly set to one or several values.

FIG. 6 shows a side view of a second embodiment of the fold-out foot rest unit 1 in the scooter according to the present invention. Here, the foot rest unit 1 is placed on the left side of the longitudinal axis of the scooter. In FIG. 6 2 refers to the main frame and 14 refers to a kick roll ("Trittrolle"). The folding out of the foot rest 13 is achieved with this second embodiment in that the left kick roll 14 which is preferably rotatable only clockwise with respect to the direction of driving is pressed downwards. Thus, the foot rest 13 is brought from the vertical position into the horizontal position which is desired for a ride. Preferably, also with this second embodiment the foot rest 13 folds back into the vertical initial position when the pressure on the kick roll 14 decreases due to the counter pressure of a strained spring (not shown here). With a foot rest unit on the right side of the longitudinal axis of the scooter—not shown in FIG. 6—a right kick roll which is preferably rotatable only counter clockwise with respect to the direction of driving would be pressed downward. Because of this limited rotatability of kick roll 14, the foot of the driver is prevented from sliding outwardly and remains close to the main frame. The surface of the kick roll 14 comprises preferably a non-slip surface. A non-slip surface can be attained for example by providing a suitable surface structure (for example grooves) and/or by the use of gummed coatings.

Also with this variant the foot rest 13 can be constructed flexibly regarding the distance to the ground by means of a further spring mechanism. In a further embodiment of the invention, the distance to the ground can be set fixedly to one or several values.

In FIG. 6 19 refers to a place, where an additional joint can be provided for alleviating the mechanical folding out of the lateral foot rest unit 1.

FIG. 7 shows top views on the second embodiment of the fold-out foot rest in the scooter according to the present invention. FIG. 7a shows a top view on the foot rest unit in the unfolded vertical state and FIG. 7b shows a top view on the foot rest unit in the horizontal state where it is pressed down. 2 refers to the main frame and 14 to the kick roll which is rotable around its longitudinal axis. The kick roll 14 shows in this embodiment a cross section with convex longer sides. The shape of the kick roll 14 can vary however over a broad range. The kick roll 14 may be for example a cylinder or a sphere.

The circumference of kick roll 14 is preferably at least as large as the distance which is to cover in vertical direction upon the folding out of the foot rest unit.

The foot rest units of the scooter according to the present invention preferably depict a non-slip surface as it is described above for the embodiment of FIGS. 6 and 7.

The at least one lateral foot rest unit 1 of the scooter according to the present invention can be folded out mechanically or by means of a motor. Preferably, the foot rest units 1 one of the scooter according to the present invention can be folded out mechanically, particularly preferred by the exertion of force through the driver. The exertion of force consists preferably in a down pressing by the driver. However, in embodiments of the invention, the foot rest unit 1 can be folded out mechanically through a lateral impact of force, such that the foot rest units are tilted out laterally.

In the case of a mechanical folding out, the foot rests are formed such that they return in general into their initial position when the load disappears. This is done preferably by means of a spring mechanism.

In embodiments of the invention, a mechanism can be provided in addition which allows, that at least one of the lateral foot rest units 1 can be brought in a fixed position, for example by means of pressing it down mechanically even further (for example through the exertion of a stronger force, or the exertion of force over a greater distance and the like). The fixed position can be achieved by means of a locking mechanism. In this manner the fixed position may be overcome by the exertion of an even stronger force or by means of another mechanism such that the foot rest unit 1 returns thereafter into its initial position when the load disappears. This transient interlock can be achieved for example by means of a pulling system ("Zugsystem") with a pull lever ("Zughebel") at the handle bar (bowden control such as for example with brakes). A second possibility of removing the lock of the foot rest unit 1 is through the provision of a mechanism which achieves a removal of the lock in that a lateral pressure is exerted in downward direction on the foot rest unit 1.

The term "self-folding" as used in the present description does therefore not exclude cases in which under certain conditions a transient lock is achieved. This lock does not change the fact that the foot rest unit of the present invention is in principal self-folding.

With the present invention, the foot rest unit may be provided with a mechanism that allows the reduction of the force which is needed to mechanically push down the foot rest unit. This can be done for example in the embodiment described in FIG. 6 in that an additional joint is provided (for example in the inflection point 19) which induces the folding out immediately upon pressing on the kick roll 14. In addition or alternatively, a guidance provided at the attachment of the rolls can alleviate the process of folding out, since the kick roll 14 moves away immediately from main frame 2. With both variants the initial position is usually attained by means of a spring mechanism.

The foot rest unit 1 is preferably placed on the left side as well as on the right side of the longitudinal axis of the scooter, whereby the foot rest units 1 are preferably self-folding and preferably height adjustable. The foot rest units 1 are then singly or jointly height adjustable. Here specific points of stoppers can be provided which determine the values for the distance between the foot rest and the roadway. The foot rest units can be fixed in the fold-out state in embodiments of the scooter according to the present invention. Here the foot rest units can also be height adjustable in addition. In general however, no fixation or transient fixation as described above is preferred in the scooters of the present invention.

The foot rest unit or units 1 are located according to the present invention between the centre of a front wheel 12 and the rear end of a rear wheel 11.

Preferably, the at least one foot rest unit 1, i.e. its centre, is located in the rear half of the scooter ahead of the centre of the driving collar of the rear wheel. Here, the rear half of the scooter is the part of the scooter that is located in the rear half of the distance between the centres of the front wheel 12 and the rear wheel 11, respectively. The foot rest unit 1 is located particularly preferred at least 2 cm ahead of the centre of the rear wheel's driving collar.

In a preferred embodiment of the invention the scooter is foldable or dismountable and can thus be easily transported. Foldable or dismountable embodiments are exemplarily shown in FIGS. 8 to 12. The folding or dismounting of the scooter according to the present invention can be done in various ways. In order to simplify the discussion, the term "foldability" comprises according to the invention the term "dismountability", whereby individual parts of the scooter may not only be folded relatively to each other, but may also be separated physically from each other. For example, the handle bar may be removed from the steering shaft and be attached at another place of the folded scooter.

FIG. 8 shows a preferred embodiment for a foldable scooter according to the present invention. In this embodiment, the scooter is folded around at least one point of inflection 15, 16. In FIG. 8 2 means the main frame, 3 the steering shaft, 5 the juncture between main frame 2 and steering shaft 3, 9 a wishbone, 11 the rear wheel, 12 the front wheel, 15 a first inflection point in the steering shaft 3 or in the front fork 4 and 16 a second inflection point in main frame 2.

Inflection points are according to the invention points, axes or systems of axes and points, which have in common that a more compact structure of the scooter can be achieved when parts of the scooter are moved around these points and axes, respectively, or through physical separation of these parts at these points and axes, respectively. It is particularly preferred with the foldable embodiments of the scooter according to the present invention if the scooter can be rotated around at least two inflection points 15, 16. With the present invention it is particularly preferred if an inflection point 15 is located between the juncture 5 (of steering shaft 3 and main frame 2) and the front fork 4 of the foldable embodiment of the scooter according to the invention. Analogous statements apply with respect to the places, where—in embodiments of the present invention—parts of the scooter can be separated physically.

FIG. 9 shows with the front wheel a first variant for the folding of the scooter according to the invention. FIG. 9*a* shows the initial state before the folding and FIG. 9*b* a state, in which the front wheel is located laterally to the main axis of the scooter according to the present invention. In this first variant the inflection point 15 comprises an axis in the direction of a transverse axis of the scooter, along which the front fork 4 with the front wheel 12 may be pushed to be rotated thereafter in the direction of the juncture 5.

With the herein shown foldable respectively dismountable embodiments of the scooter according to the invention, preferably a guidance and connection, respectively, of the parts of the scooters with positive locking exists at the inflection points in the folded state. I.e., at the inflection points at least one pair of a profile and a counter profile exists, wherein the profile forms a track for the sliding of the counter profile and the counter profile forms a track for the sliding of the profile, respectively. To this purpose various profiles and corresponding counter profiles are known to the person skilled in the art which may be shifted against each other, but which may not be rotated against each other.

According to the invention, for example two connections with positive locking, each consisting of a profile and a counter profile, can be shifted against each other along one of their sides as track, until a guidance limitation is set free and profile and counter profile may be rotated against each other. An example is shown in FIG. 9 in which the system of front fork 4 and front wheel 12 is moved in the first instance in a linear move away from steering shaft 3 until the rotation of this system around inflection point 15 is possible.

Preferably the foldable and dismountable parts of the scooter are tied positively in a manner known in the art when the scooter is in use, for increasing the stability of the scooter during a ride.

FIG. 10 shows with respect to the front wheel a second variant for the folding of the scooter according to the invention. FIG. 10a shows the initial state and FIG. 10b the state after a partial unscrewing of front wheel 12. In FIG. 10a and 10b 3 means the steering rod, 4 the front fork, 5 the juncture between steering rod 3 and main frame 2, 15 the inflection point and 9 refers to the wishbones. In the folding variant of FIG. 10, one wishbone 9 is connected detachable with the upper part of front fork 4, while the other wishbone 9 can be rotated together with front wheel 12 around the inflection point 15 in the direction of the juncture 5.

The inflection point 15 is preferably an axis that forms with the longitudinal axis of the scooter an angle which is different from 0°, such that front wheel 12 may arrive at an upper position behind the handle bar through rotation about this axis 15. This position is illustrated in FIG. 8, and FIGS. 12c and 12d, respectively.

FIG. 11 shows for the front wheel a third variant for the folding of a scooter according to the invention. FIG. 11a shows the initial state and FIG. 11b the state after the assembly of front fork and front wheel has been shifted along the longitudinal axis of the scooter. In FIG. 11 5 means the juncture of main frame 2 and steering shaft 3, 4 the front fork, 9 two wishbones ("fork legs"), 12 the front wheel and 15 an inflection point. With this variant, the front fork 4 together with the two wishbones 9 are shifted at inflection point 15 in an essentially straight movement in the direction of the longitudinal axis of the scooter until a pivot point is reached around which the front fork 4 as well as the front wheel 12 attached to it can be rotated upwards in the direction of the juncture 5. Subsequently, the front part with front fork 4 and front wheel 12 can be brought in a position aside the handle bar by rotating upwardly in the direction of juncture 5.

As shown in the discussion of FIG. 9, also with this foldable respectively dismountable embodiment of the scooter according to the invention, preferably a guidance and connection, respectively, of the parts of the scooters with positive locking exists at inflection point 15. To this purpose various profiles and corresponding counter profiles are known to the person skilled in the art. In addition, these parts of the scooter are tied positively in a manner known in the art when the scooter is being driven.

FIG. 12 shows an embodiment for a foldable scooter according to the present invention. FIG. 12a shows a side view of the scooter in a ready to drive state with the two inflection points 15 and 16. FIG. 12b shows a front view of the scooter of FIG. 12a. FIG. 12c shows a sideview of the scooter after the folding of the front wheel 12 around the inflection point 15 and before the folding of the rear part of the scooter with the rear wheel 11 in the opposite direction around the inflection point 16. FIG. 12d shows a front view of the scooter of FIG. 12c. FIG. 12e shows a side view of the front half of the folded scooter, whereby the folding of the front part 6 with the handle bar as well as the folding of the rear wheel are indicated. FIG. 12f shows schematically a front view of the completely folded scooter of FIG. 12e. In practice, however, the scooter according to the present invention will be in general in a more compact shape, in which distinct parts of the scooter intertwine with recesses of other parts of the scooter (in particular on main frame 2), in order to secure a package size which is as small as possible.

In order to achieve a package size as small as possible, it is advantageous, if front wheel and rear wheel directly follow each other laterally on the main frame. I.e., front fork and the mounting of the rear wheel should preferably be such that they may disappear above or below the main frame or be plunged in recesses of other parts of the scooter (in particular in the main frame).

In the embodiments shown in FIGS. 8 to 12, front and rear part, respectively, of the scooter according to the invention with the front wheel 12 and the rear wheel 11, respectively, are rotatable in the inflection point 16 around an axis provided in the main frame 2, the axis being in general vertical with respect to the transverse axis of the scooter. Optionally, the inflection point 16 can be omitted or the inflection point 16 can be located at another position. According to the invention, additional inflection points are possible.

The folding possibilities shown in FIGS. 8 to 12 are examples. Additional folding possibilities are conceivable according to the present invention. It is also possible to have a one-sided mounting of the wheels, which allows for an additional reduction in the size of the package of the folded scooter.

A still further possibility of folding according to the present invention comprises a step of folding the front wheel wherein the front wheel with the handle bar is rotated by nearly 180° (in general until a point where snapping occurs), a lock is opened at the two wishbones on the suspension fork and through this a possibility for folding to the top in the direction of the main frame is set free, whereby the inflection point is preferably directly on the level of the upper edge of the front wheel. Since the front wheel is not completely rotated by 180°, it swings by the main frame upon folding.

The connection between the individual parts at the inflection points 15, 16 is preferably realized by ties which are detachable without any tools, in particular by means of quick clamping devices (for example so-called "Leichtschnellspanner") and bayonet coupling.

In general, the scooter according to the invention is stabilized in the folded state in a manner known to the person skilled in the art.

The scooter according to the invention comprises preferably at least one additional foot rest 10. Such a foot rest 10 is shown for example in FIGS. 1 and 13. The foot rest 10 is preferably located in a central position, i.e. on the connecting line between front wheel 12 and rear wheel 11. The foot rest 10 is preferably attached to a rigid bar ("Schwingarm") 17. This foot rest 10 is in general in a rigid fixed position during ride, such that the distance between foot rest 10 and the rear wheel 11 preferably does not change. This foot rest may however be formed as foldable.

The foot rest 10 is preferably attached to the section which is without suspension and preferably serves the driver to jump up when the scooter is started. Moreover, the foot rest 10 is suitable to increase the ground clearance in pathless terrain, when the lateral foot rest units 1 fold in again.

For the sake of stability, the additional foot rest 10 is preferably located centrally between the centre of front wheel 12 and the rear end of rear wheel 11. It is particularly preferred when the additional foot rest 10 is located between the end of the front wheel and a point which is located not more than 20 cm, more particularly preferred not more than 10 cm behind the centre of the rear wheel. The foot rest 10 may consist of one or more parts and should be large enough to allow a foot to be placed thereon at least partially.

Depending on the intended use of the scooter according to the invention, the scooter might be provided with a suspension system (to be termed also "damping"). While the suspension system is of lesser importance for locomotion in a plain on a smooth surface, suspension (damping) is of great importance with downhill rides over bumpy terrain.

The suspension of the scooter according to the invention can be achieved in various ways. Suspension can take place on the front and/or rear wheel. In general, suspension is provided at least for the front wheel (front suspended). This is achieved in that a spring fork ("Federgabel") is used as the front fork instead of a rigid fork. A scooter in which only the front wheel is suspended and which is distinguished by a lower weight, may be termed a "hardtail" scooter. With the scooters which are termed "fully", both the front part and the rear part are suspended (front and rear suspension). The long undercarriage ("Fahrwerk") filters the hardest impacts. With the fully suspended scooters, comfort is usually higher and the traction better.

The suspension can be placed in the steering shaft 3 or in the two fork legs 9 of the fork (for example front fork 4). The type of suspension is not limited with the scooter of the invention. With respect to the desired degree of comfort and costs, specific types of suspension are preferred. According to the invention, the lighter air damped suspension systems are advantageous over the heavier models with steel springs, if one is concerned with the weight of the scooter.

A spring fork works in that a sleeve of the fork leg slides up and down above a standpipe. The fork legs react on the contours of the terrain, above which one rolls and provide a soft drive above holes and bumps. In order to absorb impacts, the fork possesses a damping element, an air chamber (air/oil) or a steel spring (spring/oil). Both will be pressed together upon impact and will separate thereafter. The speed with which this occurs (damping) will be controlled in general, except for the simplest cases, by means of an oil cartridge or an open oil bath in one of the fork bars. Conventionally, air-oil-systems have shorter spring travel. They are however light and are therefore to be found on cross-country—scooters. Spring—oil—systems show longer spring travels and provide more options for adjustment, such that they are better suited for rough terrain and downhill rides.

The characteristics of a spring fork can be modified in various ways. For example, with an air-oil-fork by exchanging the oil and with a spring-oil-fork by exchanging oil and spring. Harder springs can be installed, if the fork snaps through regularly in the terrain or if it reacts too strongly on the impacts of the underground. If the fork reacts only on big impacts and scarcely on small impacts, the springs should be replaced by softer ones.

As the oil in the fork, oils of different viscosity may be used. Through this the resistance will be amended which is set against the damping stick ("Dämpferstange"), when the fork is immersed. If the fork reacts too quickly on the underground or if the scooter stutters upon use of the brakes, the change to a more viscous oil might help.

For the use in downhill rides in challenging terrain a scooter is demanded which may absorb strong impacts at high speeds. In scooters for this field, termed "Enduro" with mountain bikes, steel spring forks are used preferably for suspension (steel spring/oil—damper). Here, the long-stroke forks which may be provided also with a vario option, reveal currently the best performance. The weight is here of minor importance. According to the invention, spring forks with long spring-travel that allow to swallow thick chucks, for example with spring-travels of 80 to 100 mm, are preferred for downhill rides.

It is advantageous for a scooter in the Enduro region that the spring-travels are fully adjustable during a ride, for example from a spring-travel of about 100 mm up to 130 mm—fore and aft. With a known Vario—spring fork, the settings can be amended by means of a rotary knob. The steepness and condition of a trail will determine whether the suspension will be set firm or soft.

In general, a scooter for use in downhill rides in pathless terrain of the present invention will be provided with suspension on both wheels (fully suspended). Here, a spring fork on the front wheel will be combined in general with a suspension in the rear, whereby the rear wheel may also absorp impacts. Air—oil—and spring—oil-combinations, that are to be found in spring forks are according to the invention advantageous also for the rear damper. The rear damper may also comprise a possibility for blocking (Lock-out, Override—mechanism) which allows the rear machine section to freeze if necessary. Advantageously, a pressure step damping ("Druckstufendämpfung") can be set, in order to adjust the speed of the "shock strut compression" ("Einfedergeschwindigkeit").

The scooter according to the invention comprises in general brakes. The type of the brakes to be used is not limited with the scooter of the invention. Depending on the use of the scooter according to the invention, specific brakes are advantageous. In general, disc brakes (to be called also "discstopper") and/or calliper (rim) brakes are used.

With scooters that are to be used in a plain on smooth surfaces, a calliper brake is used in general. Calliper brakes have the advantages of a low weight and a low prize.

When thick, comfortable tyres are used, cantilever brakes ("Cantileverbremsen") are advantageous. Cantilever brakes, due to their great distance from the wheel rims, are furthermore comparably unsusceptible against pollution.

For scooters which are to be used in hilly uneven terrain ("downhill scooter"), brakes are in general used that are also used for mountain bikes or hithero known mountain scooters. For this application of the scooters according to the invention, disc brakes have proven advantageous.

With down-hill—scooters, cantilever brakes may also be used. According to the invention it is however preferred to use a V-brake, as it can be more easily adjusted and is uncomplicated in maintenance. A V-brake is therefore standard equipment in most of the present mountain- and hybrid bikes. The long legs of V-brakes in comparison with a conventional rim brake result in a longer leverage and thus for more brake power.

Reliable disc brakes are meanwhile commercially available for each area of application. Disc brakes are in general somewhat heavier than cantilever brakes or V-brakes. However, the brake force is greater and can be dosed in a better manner. Disc brakes have moreover the big advantage that the brake power is not influenced by atmospheric conditions. While the brake power of cantilever brakes and V-brakes strongly decreases under wet conditions, disc brakes always react in the same manner, even with light damages to the running wheel or wheel rim.

In accordance with the present invention, in general mechanically or hydraulically actuated disc brakes are used. Mechanical disc brakes pose higher requirements on their maintenance. The brake power meanwhile reaches nearly the one of hydraulic systems, but the dosability of the brake power of mechanical disc brakes is still worse than with hydraulic disc brakes. On the other hand, mechanical disc brakes work with normal brake strings (rope strings) [Bremszügen (Seilzügen)] and do thus not require specific brake leverages. Mechanical disc brakes are therefore much cheaper.

Hydraulic disc brakes are superior to the conventional V-brakes with respect to brake power, since normal rim brakes do not grip that strongly because of the length of the strings. Hydraulic disc brakes are therefore preferably utilized in downhill—scooters.

If cross-country mobility is of importance with the scooters according to the present invention and if a substantial rotation of the front wheel is important, than a gyro control record ("Gyro-Steuersatz") may optionally avoid the distortion of the brake cables even when the front wheel rotates by 360 degrees.

The tyre equipment of the scooters according to the invention is not limited. Size and type of the tyres to be used in the scooter according to the present invention depend first of all on the use of the scooter. Front wheel and rear wheel can be of different size, whereby for particular fields of application the diameter of the front wheel may be for example larger than the diameter of the back wheel. The diameters of the wheels are in general smaller for applications within cities as compared to applications in hilly terrain. For applications in a plain on a smooth roadway tyres are in general used that do not have a too coarse profile. For applications on free terrain, for example for downhill drives in hilly terrain with rough soil conditions, in general tyres with coarse cleats are being used.

For downhill rides mostly tyres with coarser cleats are used than for cross country rides. Tyres with coarser cleats bring the brake power of the large disc brakes which are to be used here preferably to the ground.

The shape of the wheel rims can vary broadly with the scooters according to the invention. According to the invention, holohedral wheel rims may be used, or wheel rims that comprise several circle sections. Moreover, wheels with spokes can be used whose number in the front wheel and in the rear wheel of the scooter according to the invention can vary broadly.

In a preferred embodiment of the scooter according to the invention, which is used in particular in pathless terrain, the juncture 5 is located between steering shaft 3 and main frame 2 in the upper half of the axis through steering shaft 3 and front fork 4. With this embodiment, the wheels have in general a diameter of more than 15 cm, preferably more than 25 cm and most preferred of more than 30 cm. In this embodiment the optional foot rest 10 is in general shorter than the sum of the diameters of the front wheel and the rear wheel.

Depending on the intended use of the scooter, the frame of the scooter according to the present invention may depict different shapes. Examples for particularly suited frame constructions are shown in FIG. 17. These encompass stabile, in general heavier frame constructions, which are used in particular for scooters for downhill drives ("downhill scooter") (see for example FIG. 17c) and less robust, however lighter frame constructions (see for example FIG. 17a).

As is apparent from FIG. 17a and 17c, a frame construction is also possible according to the present invention, in which the main frame is connected via two or more junctures with the steering shaft.

The particularity of the invention lies in the fact that the frame in the area of the rear wheel is not required to be close to the ground in order to allow that a common foot rest for scooters can be used.

Preferably, the main frame extends from the juncture 5 between main frame 2 and steering shaft 3 essentially in a straight or lightly curved manner in the direction of the rear wheel.

In a further preferred embodiment of the scooter according to the invention, which is used on flat ground, in particular within cities, the juncture 5 is located between steering shaft 3 and main frame 2 in the lower half, preferably in the lower third of the axis through steering shaft 3 and front fork 4. With this embodiment, the wheels have in general a diameter of less than 50 cm, preferably less than 35 cm and most preferred of less than 25 cm. In this embodiment, the optional foot rest 10 is in general shorter than the sum of the diameter of front wheel and rear wheel.

The geometry of the scooter according to the present invention can be varied to a considerable extent, such that it may be adapted to body size, step length, arm length etc.

As an example, according to FIG. 14, the angle between the steering shaft 3 and the main frame 2 can be altered. This is achieved in particular by means of a swivel joint 18 at the juncture 5 between steering shaft 3 and main frame 2. Through this the wheel base can be varied for example.

Upon utilization of a two-part main frame 2 as it is used in particular with foldable scooters, the main frame 2 can be extended. In the case of a foldable scooter, the extension of the main frame 2 can be done preferably starting from inflection point 16 in two directions to the same extent (see FIG. 15). Through this, an optimum fit in the folded state of the scooter can be achieved.

FIG. 16 shows how the geometry of the handle bar can be changed in a manner known in the art. FIG. 16a illustrates the height adjustability of the steering shaft 3. FIG. 16b shows the height adjustability of the front end, whereby the handle bar 7 can be adjusted with respect to height independent from steering shaft 3. The front end can be shifted in the area of the steering shaft to the front or to the back (FIG. 16c). FIG. 16d shows a combination of the variants of FIG. 16b and FIG. 16c. In the variant of FIG. 16e the front end is partitioned. The function of FIG. 16b can be exerted and the height of the front end can be changed. In addition, the handle bars and the possibilities for adjustment of the handle bar which are known in the field of mountain bikes can be used.

For steering, in general two different control records ("Steuersätze") can be utilized: control records without threads ("Gewindelose Steuersätze"), also termed "ahead"— control records, and control records with threads. By rearranging handle bar 7 and front end 6, the control record can be adjusted. In a preferred embodiment, the handle bar is foldable and foldaway.

The scooter according to the present invention can comprise optionally a seat which is attached to a sitting bar (not shown in the Figures) ("Sitzrohr") that is in generally connected with the frame of the scooter. For particularly rough driving conditions a double clamping instead of a single clamping may be used for the sitting bar.

According to its use, the scooter according to the invention can be provided with further devices, as for example illumination, front and rear reflectors, a bell, a locking device, mountings and pockets for different kinds of baggage, mudguards, etc.

The foot rests can be provided according to the invention with a profile, such that the driver can lock or unlock his shoes in the foot rest by means of a clicking mechanism—similarly to mountain bikes.

The frame of the scooter according to the present invention consists in general of several beams and supports which are connected with each other through joints (for example swivel joints) and which are rotatable towards each other in particular embodiments. The beams and supports are in general straight or curved, preferably essentially straight, rigid construction elements with profile shapes, for example O—profiles with square or round cross section.

As materials for the scooters of the present invention, the materials known so far for use in scooters and bicycles can be utilized. The selection of materials is otherwise not limited and depends in particular on the intended use of the scooters. Preferably, the frame components consist of a metal (for example aluminum or steel, for example thin-walled steel tubes), a metal alloy or a plastic material which may be reinforced with glass fibers etc. A preferred plastic material is Carbon. The use of a scandium—aluminum—alloy (ca. 2-3 weight % scandium) can result in about 10% weight savings for the frame.

The scooter according to the present invention can be used as means of locomotion within cities as well as in the two-wheeler sport. Depending on the intended use, at least three basic variants are conceivable in the two-wheeler sport:

1. Ultra: extremely light design for use in mountain sport or within cities, as these applications require essentially low weights. This model will be often without suspension.
2. Allround: most multi-purpose utilization, less light, however equipped with a suspension system. This variant is used in mountain sport and leasure time sport, respectively.
3. Extreme: extremely stabile design, moreover equipped with a very good suspension system. The weight is here of less importance. Areas of application are downhill, fun sport, street sport. The scooter of the present invention can be driven by the muscular strength of the driver or by means of a motor (for example a gasoline or electric motor, respectively).

The scooters according to the present invention (which may be termed also "trail device with scooter function") are distinguished by their improved suitability for terrain and manoeuvrability. This is of particular advantage for the use in public areas, for example on sidewalks and places, but also in pathless terrain. Moreover, the scooter of the present invention in its foldable variant can be packed into very small packages.

The scooters according to the present invention allow a small wheel base. A scooter can be realized that although light in weight shows best performance when riding in the open terrain. The scooter according to the present invention provides a better balance as compared to known scooters (driver does not stand on the longitudinal axis) and a variable ground clearance. Optimal conditions exist for changing requirements (operation as scooter and/or trail operation). With the use of an additional central foot rest, a maximum ground clearance can be achieved during riding.

The invention claimed is:

1. A scooter with a frame, at least one front wheel (12), at least one rear wheel (11), a steering gear comprising of a steering shaft (3), a front end (6), and a handle bar (7), at least one front wheel (12) which is tractable with the steering gear, and a connecting axis which connects the front and the rear wheels, wherein the scooter comprises a laterally fold-out foot rest unit (1) on the left and/or right side of the connecting axis and between the centre of the front wheel and the rear end of the rear wheel, wherein the laterally fold-out foot rest unit (1) cannot exert the function of a crank, whereby the foot rest unit (1) can be folded out mechanically or by means of a motor and whereby upon mechanically folding out the foot rest unit (1) returns in its starting position upon discontinuation of the force.

2. The scooter according to claim 1, wherein the foot rest unit (1) is singly or jointly height adjustable.

3. The scooter according to claim 1, wherein the scooter further comprises a front fork (4) which connects the steering shaft (3) and the front wheel (12), and wherein the scooter further comprises a juncture (5) between the steering shaft (3) and a main frame (2), said juncture (5) being located in the upper half of the axis through the steering shaft (3) and the front fork (4).

4. The scooter according to claim 1, wherein the scooter further comprises a front fork (4) which connects the steering shaft (3) and the front wheel (12), and wherein the scooter further comprises a juncture (5) between the steering shaft (3) and a main frame (2), said juncture (5) being located in the lower half of the axis through the steering shaft (3) and the front fork (4).

5. The scooter according to claim 1, which comprises at least one additional foot rest (10) on the connecting axis through front wheel (12) and rear wheel (11).

6. The scooter according to claim 1, which is foldable and/or dismountable.

7. The scooter according to claim 3 which is foldable at least around an inflection point (15), which is located between the juncture (5) of the steering shaft (3) with the main frame (2) and the front fork (4).

8. The scooter according to claim 1, wherein the at least one foot rest unit (1) is located in the rear half of the scooter ahead of the centre of the driving collar of the rear wheel.

9. The scooter according to claim 4, which is foldable at least around an inflection point (15), which is located between the juncture (5) of the steering shaft (3) with the main frame (20) and the front fork (4).

* * * * *